US009232438B2

(12) United States Patent
Hall et al.

(10) Patent No.: US 9,232,438 B2
(45) Date of Patent: Jan. 5, 2016

(54) DEVICE AND A SYSTEM FOR IP TRAFFIC OFFLOADING

(75) Inventors: Goran Hall, Molndal (SE); Stefan Rommer, Vastra Frolunda (SE); Ann-Christine Sander, Vastra Frolunda (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 303 days.

(21) Appl. No.: 13/699,169

(22) PCT Filed: May 19, 2011

(86) PCT No.: PCT/EP2011/058157
§ 371 (c)(1),
(2), (4) Date: Nov. 20, 2012

(87) PCT Pub. No.: WO2011/144700
PCT Pub. Date: Nov. 24, 2011

(65) Prior Publication Data
US 2013/0064086 A1 Mar. 14, 2013

Related U.S. Application Data

(60) Provisional application No. 61/346,979, filed on May 21, 2010.

(51) Int. Cl.
*H04L 12/26* (2006.01)
*H04W 28/08* (2009.01)
(Continued)

(52) U.S. Cl.
CPC .............. *H04W 28/08* (2013.01); *H04W 28/06* (2013.01); *H04W 76/025* (2013.01); *H04W 76/041* (2013.01); *H04W 80/04* (2013.01); *H04W 88/16* (2013.01); *H04W 92/24* (2013.01)

(58) Field of Classification Search
CPC ...... H04L 47/10; H04L 12/5602; H04L 47/27; H04L 2012/5635
USPC .................... 370/231, 230.1, 230, 235, 236
See application file for complete search history.

(56) References Cited

U.S. PATENT DOCUMENTS

2002/0045447 A1* 4/2002 Rasanen ................... 455/436
2007/0259673 A1* 11/2007 Willars et al. ............ 455/453
(Continued)

OTHER PUBLICATIONS

3GPP TR 23.829 V0.3.1 'Local IP Access and Selected IP Traffic Offload' (Nov. 2009) Release 10, pp. 8-12.*
Prior Art Publishing GmbH, 'Generic Policy Control for Local Breakout' (Nov. 17, 2009) IP.com No. IPCOM000190087D, pp. 5-11.*
(Continued)

*Primary Examiner* — Anez Ebrahim
*Assistant Examiner* — Siren Wei
(74) *Attorney, Agent, or Firm* — Rothwell, Figg, Ernst & Manbeck, P.C.

(57) ABSTRACT

A Mobile Control Entity (125, 225) for a system (100, 200), arranged to communicate with a first Mobile Gateway (110, 210) and a Radio Network Control Entity (130, 230), to receive an instruction from the first Mobile Gateway (110, 210) to arrange a filter for IP traffic from User Equipments (135, 235) in the Radio Network Control Entity (130, 230), to receive data from the first Mobile Gateway (110, 210) regarding the filter, comprising information on which IP traffic from User Equipments to forward to the first or to a second (120, 220) Mobile Gateway respectively, to transmit instructions to a second Mobile Gateway (120, 220) to establish a connection to the Radio Network Control Entity (130, 230) for IP traffic from User Equipments, and to transmit the instructions and the data regarding the IP traffic filter to the Radio Network Control Entity (130, 230).

15 Claims, 9 Drawing Sheets

(51) Int. Cl.
  *H04W 28/06* (2009.01)
  *H04W 76/02* (2009.01)
  *H04W 76/04* (2009.01)
  *H04W 80/04* (2009.01)
  *H04W 88/16* (2009.01)
  *H04W 92/24* (2009.01)

(56) References Cited

U.S. PATENT DOCUMENTS

| | | | |
|---|---|---|---|
| 2009/0185524 A1* | 7/2009 | Sammour et al. | 370/328 |
| 2010/0278108 A1* | 11/2010 | Cho et al. | 370/328 |
| 2011/0045834 A1* | 2/2011 | Kim et al. | 455/438 |
| 2011/0116499 A1* | 5/2011 | Lim et al. | 370/355 |
| 2011/0185049 A1* | 7/2011 | Atreya et al. | 709/222 |

OTHER PUBLICATIONS

"3rd Generation Partnership Project; Technical Specification Group Services and System Aspects; Local IP Access and Selected IP Traffic Offload; (Release 10)" 3GPP Standard; 3GPP TR 23.829, 3rd Generation Partnership Project (3GPP), Mobile Competence Centre; 650, Route Des Lucioles; F-06921 Sophia-Antipolis Cedex, France, No. V0.3.1, Dec. 6, 2009, pp. 1-26, XP050400506.

"Generic Policy Control for Local Breakout", IP.com Journal, IP.com Inc., West Henrietta, NY, US, Nov. 17, 2009, 12 pages, XP013135390.

ZTE, "Discussion on LIPA_SIPTO Solution", 3GPP Draft, S2-096637_S2_76 Discussion on LIPA_SIPTO Solution REV3, 3rd Generation Partnership Project (3GPP), Mobile Competence Centre, 650 Route Des Lucioles, F-06921 Sophia-Antipolis Cedex, France, No. Cabo, Nov. 16, 2009, 6 pages, XP050397577.

* cited by examiner

DEVICE AND A SYSTEM FOR IP TRAFFIC OFFLOADING

CROSS-REFERENCE TO RELATED APPLICATIONS

This application is a 35 U.S.C. §371 National Phase Application from PCT/EP2011/058157, filed May 19, 2011, and designating the United States, and claims priority to Provisional Application No. 61/346,979, filed May 21, 2010. The above-mentioned applications are incorporated by reference herein.

TECHNICAL FIELD

The present invention discloses a device and a system for obtaining reduced IP traffic load in a Gateway Node or a transmission network in a wireless access system.

BACKGROUND

Operators of wireless access systems such as, for example, WCDMA or LTE systems have an interest in offloading uplink IP traffic from certain of their Packet Core nodes and/or transmission network such as, for example, a Gateway GPRS Support Node, a GGSN in a WCDMA system.

One known solution for offloading uplink IP traffic from a node such as a GGSN is to have a so called Traffic Offload Function, a TOF, in the system for diverting certain IP traffic flows from reaching the GGSN in question, and instead letting the TOF direct those IP traffic flows to another node in the system, such as, for example, a secondary or auxiliary GGSN, possibly one with reduced functionality which, however, is enough for the diverted IP traffic flows, as an alternative to which the TOF itself can include such a simplified GGSN functionality.

Drawbacks to the TOF solution to offloading IP traffic from a node such as a GGSN include User Equipment state handling, Mobility, Quality of Service and charging accuracy.

SUMMARY

It is a purpose of the present invention to provide a solution for offloading IP traffic from a node such as a GGSN in a wireless access system which obviates at least some of the drawbacks mentioned above of previous solutions.

This purpose is obtained by the present invention in that it discloses a Mobile Control Entity for a wireless access system. The Mobile Control Entity is arranged to communicate with a first Mobile Gateway and a Radio Network Control Entity. The Mobile Control Entity is further arranged to:
  receive an instruction from the first Mobile Gateway that a filter for IP traffic from one or more User Equipments in the system should be arranged in the Radio Network Control Entity,
  receive data from the first Mobile Gateway regarding the filter, said data comprising information on which IP traffic from one or more User Equipments that should be forwarded to the first or to a second Mobile Gateway respectively,
  transmit instructions to a second Mobile Gateway that it should establish a connection to the Radio Network Control Entity for IP traffic from one or more User Equipments in the system,
  transmit the instructions and the data regarding the IP traffic filter to the Radio Network Control Entity.

The invention also discloses a Mobile Control Entity for a wireless access system which is arranged to communicate with a first Mobile Gateway and a Radio Network Control Entity. The Mobile Control Entity is further arranged to:
  receive an instruction from the first Mobile Gateway that a filter for IP traffic from one or more User Equipments in the system should be arranged in a second Mobile Gateway,
  receive data from the first Mobile Gateway regarding the filter, said data comprising information on which IP traffic from one or more User Equipments that should be forwarded to the first or within the second Mobile Gateway respectively,
  transmit instructions to the second Mobile Gateway that it should establish a connection to the Radio Network Control Entity for IP traffic from one or more User Equipments in the system,
  transmit the instructions and the data regarding the IP traffic filter to the second Mobile Gateway.

In one embodiment, the Mobile Control Entity is a Serving GPRS Support Node, an SGSN, for a WCDMA system, for which SGSN:
  The first and second Mobile Gateways are Gateway GPRS Support Nodes, GGSNs,
  the Radio Network Control Entity is a Radio Network Controller, an RNC.

In one embodiment, the Mobile Control Entity is a Serving GPRS Support Node, an SGSN, for a WCDMA system, for which SGSN:
  the first and second Mobile Gateways comprise a Packet Data Network Gateway, a PDN GW, and a Serving Gateway, a Serving GW,
  the Radio Network Control Entity is an eNodeB.

In one embodiment, the Mobile Control Entity is a Mobility Management Entity, an MME, for an LTE system, for which MME:
  The first and second Mobile Gateways both comprise a PDN GW, Packet Data Network Gateway and at least one of them comprises a serving Gateway,
  the Radio Network Control Entity is an eNodeB.

By means of the invention, uplink IP traffic can be "diverted" from first Mobile Gateway, such as a GGSN, and instead directed to a second Mobile Gateway such as an auxiliary GGSN, with a high degree of granularity, i.e. the filter can be per User Equipment, or per service utilized by the User Equipments in the system, or for a certain group of User Equipments, etc.

The invention also discloses a wireless access system comprising:
  a Mobile Control Entity,
  a first Mobile Gateway,
  a Radio Network Control Entity,
in which wireless access system the Mobile Control Entity is arranged to communicate with the first Mobile Gateway and the Radio Network Control Entity, and the first Mobile Gateway and the Radio Network Control Entity are arranged to communicate with each other. The system also comprises a second Mobile Gateway, and:
  the first Mobile Gateway is arranged to instruct the Mobile Control Entity that a filter for IP traffic from one or more User Equipments in the system should be arranged in the Radio Network Control Entity,
  the Mobile Control Entity is arranged to:
    receive an instruction from the first Mobile Gateway that a filter for IP traffic from one or more User Equipments in the system should be arranged in the Radio Network Control Entity, receive data from the first Mobile Gateway regarding the filter, said data comprising information on which IP traffic from one or more User Equipments that should be forwarded to the first or to the second Mobile Gateway respectively, transmit instructions to the second Mobile Gateway that it should establish a connection to the Radio Network Control Entity for IP traffic from one or more User Equipments in the system, transmit the instructions and the data regarding the IP traffic filter to the Radio Network Control Entity.

the Radio Network Control Entity is arranged to receive instructions from the Mobile Control Entity that a filter for IP traffic from one or more User Equipments in the system should be arranged in the Radio Network Control Entity, and to carry out the function of said filter, regarding which traffic that should be sent to the first or the second mobile Gateway.

In addition, the invention discloses a wireless access system comprising:

a Mobile Control Entity,
a first Mobile Gateway,
a Radio Network Control Entity, in which wireless access system the Mobile Control Entity is arranged to communicate with the first Mobile Gateway and the Radio Network Control Entity, and the first Mobile Gateway and the Radio Network Control Entity are arranged to communicate with each other. The system also comprises a second Mobile Gateway, and:

the first Mobile Gateway is arranged to instruct a second Mobile Gateway that a filter for IP traffic from one or more User Equipments in the system should be arranged in the second Mobile Gateway, the Mobile Control Entity is arranged to:
receive an instruction from the first Mobile Gateway that a filter for IP traffic from one or more User Equipments in the system should be arranged in the second Mobile Gateway, receive data from the first Mobile Gateway regarding the filter, said data comprising information on which IP traffic from one or more User Equipments that should be forwarded to the first Mobile Gateway or be forwarded within the second Mobile Gateway, transmit instructions to the second Mobile Gateway that it should establish a connection to the Radio Network Control Entity for IP traffic from one or more User Equipments in the system, transmit the instructions and the data regarding the IP traffic filter to the second Mobile Gateway.

the Radio Network Control Entity is arranged to receive instructions from the Mobile Control Entity that a filter for IP traffic from one or more User Equipments in the system should be arranged in the Radio Network Control Entity, and to carry out the function of said filter, regarding which traffic that should be sent to the first or the second mobile Gateway.

In one embodiment, the wireless access system is a WCDMA system, in which:

the Mobile Control Entity is a Serving GPRS Support Node, an SGSN,
the first and second Mobile Gateways are Gateway GPRS Support Nodes, GGSNs,
the Radio Network Control Entity is a Radio Network Controller, an RNC.

In one embodiment, the wireless access system is a WCDMA system, in which:

the Mobile Control Entity is a Serving GPRS Support Node, an SGSN,
the first and second Mobile Gateways comprise a Packet Data Network Gateway, a PDN GW, and a Serving Gateway, a Serving GW,
the Radio Network Control Entity is an eNodeB.

In one embodiment, the wireless access system is an LTE system, in which:

the Mobile Control Entity is a Mobility Management Entity, an MME,
the first and second Mobile Gateways both comprise a PDN GW, Packet Data Network Gateway and at least one of them comprises a serving GW,
the Radio Network Control Entity is an eNodeB.

BRIEF DESCRIPTION OF THE DRAWINGS

The invention will be described in more detail in the following, with reference to the appended drawings, in which.

DETAILED DESCRIPTION

The invention will mainly be described in the following with reference to a WCDMA system, and hence also mainly with terminology from the WCDMA standard. However, it should be pointed out that the invention can equally well be applied to an LTE system.

Figure 1:
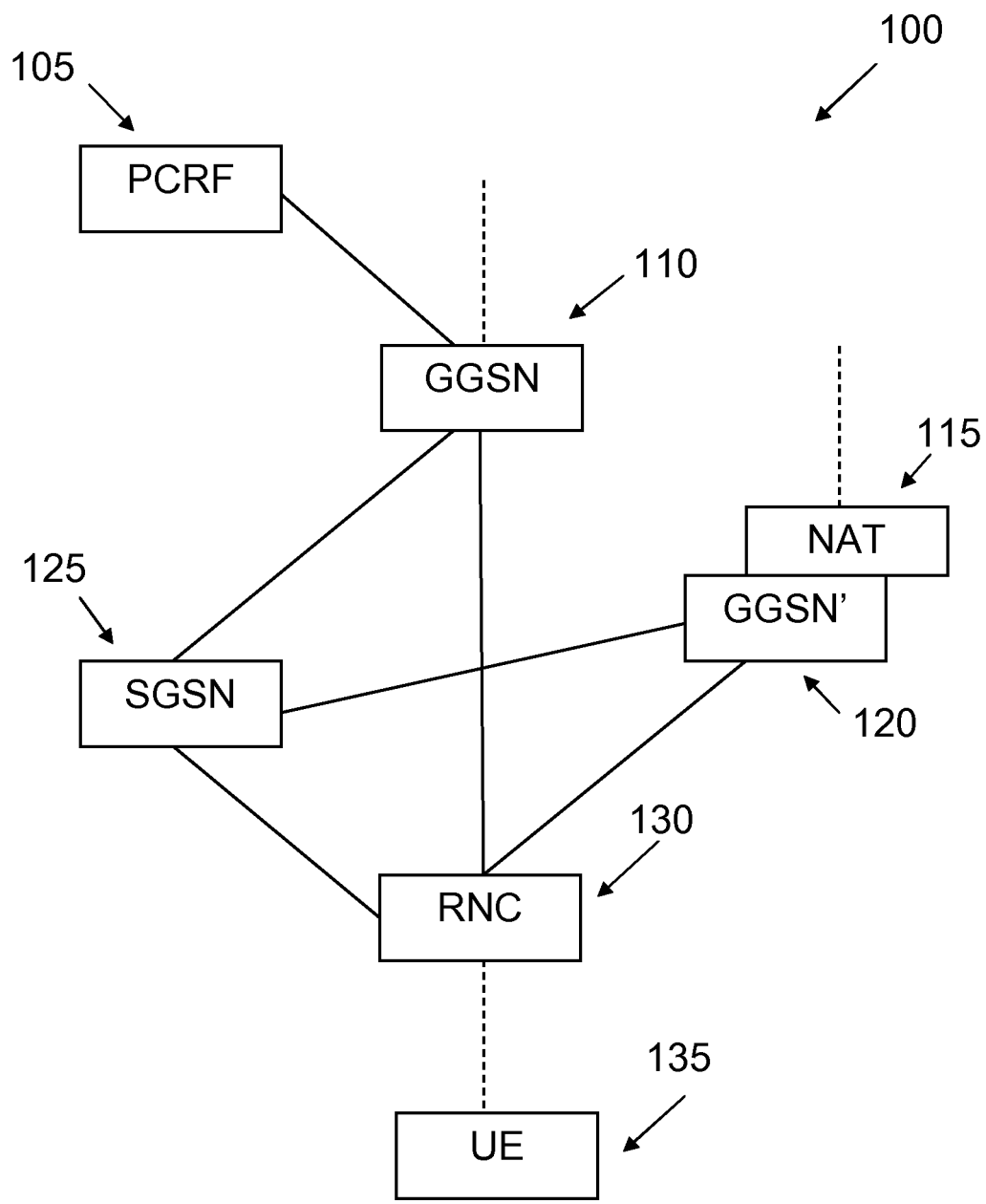
FIGS. 1-4 show schematic views of a system of the invention.

FIG. 1 shows a schematic view of a system 100 in which the invention is applied. The system 100 is a WCDMA system, and comprises a GGSN 110, a SGSN 125, an RNC 130 and an Offloading Gateway Node 120, in FIG. 1 shown as GGSN', since the node can, in one embodiment, be a GGSN. In addition, the system comprises an RNC, a Radio Network Controller, 130, and in one embodiment, the system comprises a node 105 for PCRF, Policy and Charging Rules Function.

In addition, one User Equipment 135, UE, is shown in FIG. 1. The UE 135 is shown connected to RNC 130 by means of dashed lines, intended to signify that there are additional nodes between the UE 135 and the RNC 130.

Figure 2:
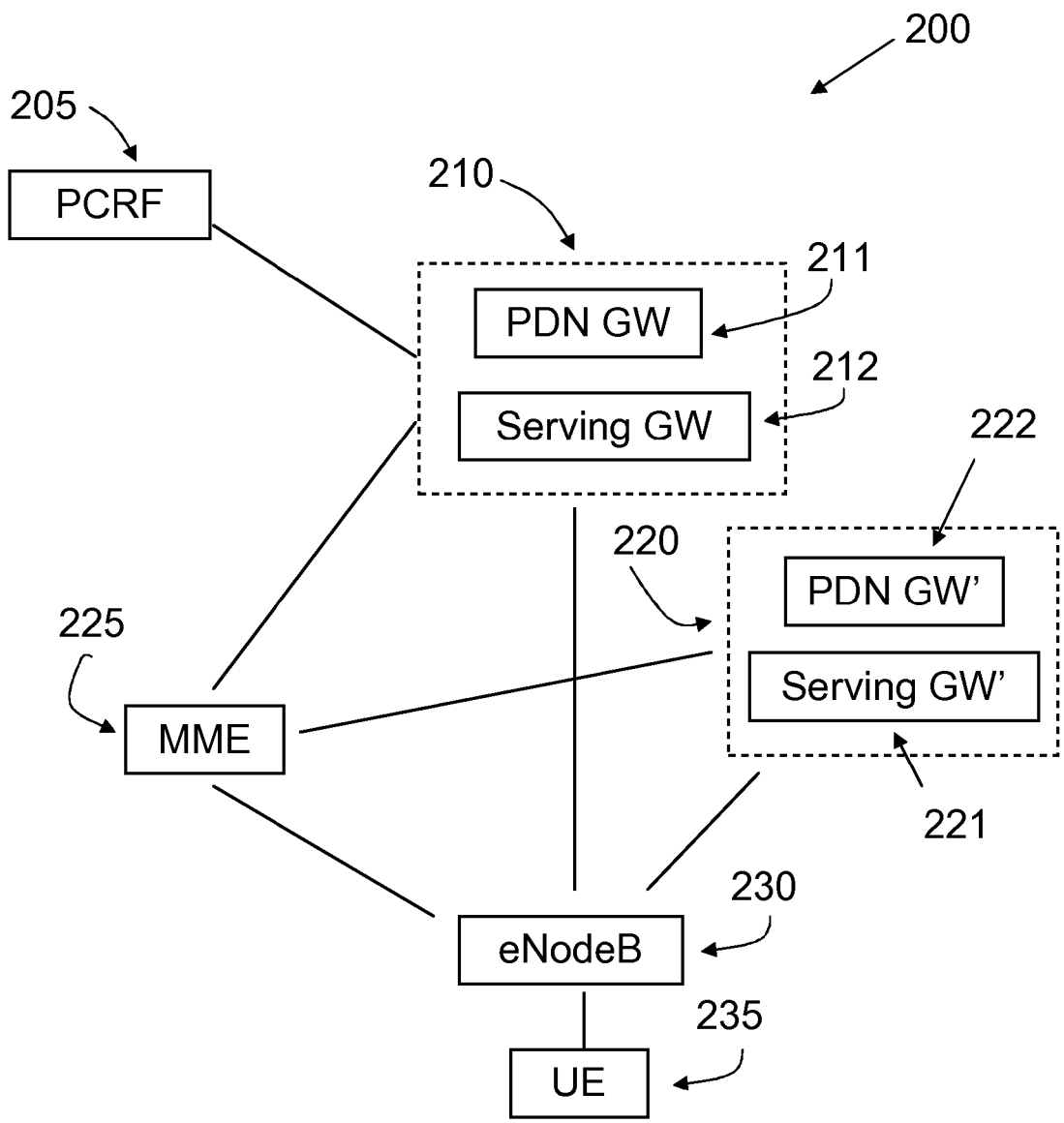

In FIG. 2, an LTE system 200 is shown in which the invention is applied. The LTE system 200 comprises a Mobile Gateway 210 comprising a PDN GW, Packet Data Network Gateway 211 together with a serving GW, Gateway, 212, an MME, Mobility Management Entity 225, an eNodeB 230 and an Offloading Mobile Gateway 220, in FIG. 2 shown as a combination of a PDN GW' 222 and a Serving GW', 221.

Also, a User Equipment 235, UE, is shown in FIG. 2, attached to the eNodeB 230.

Figure 3:
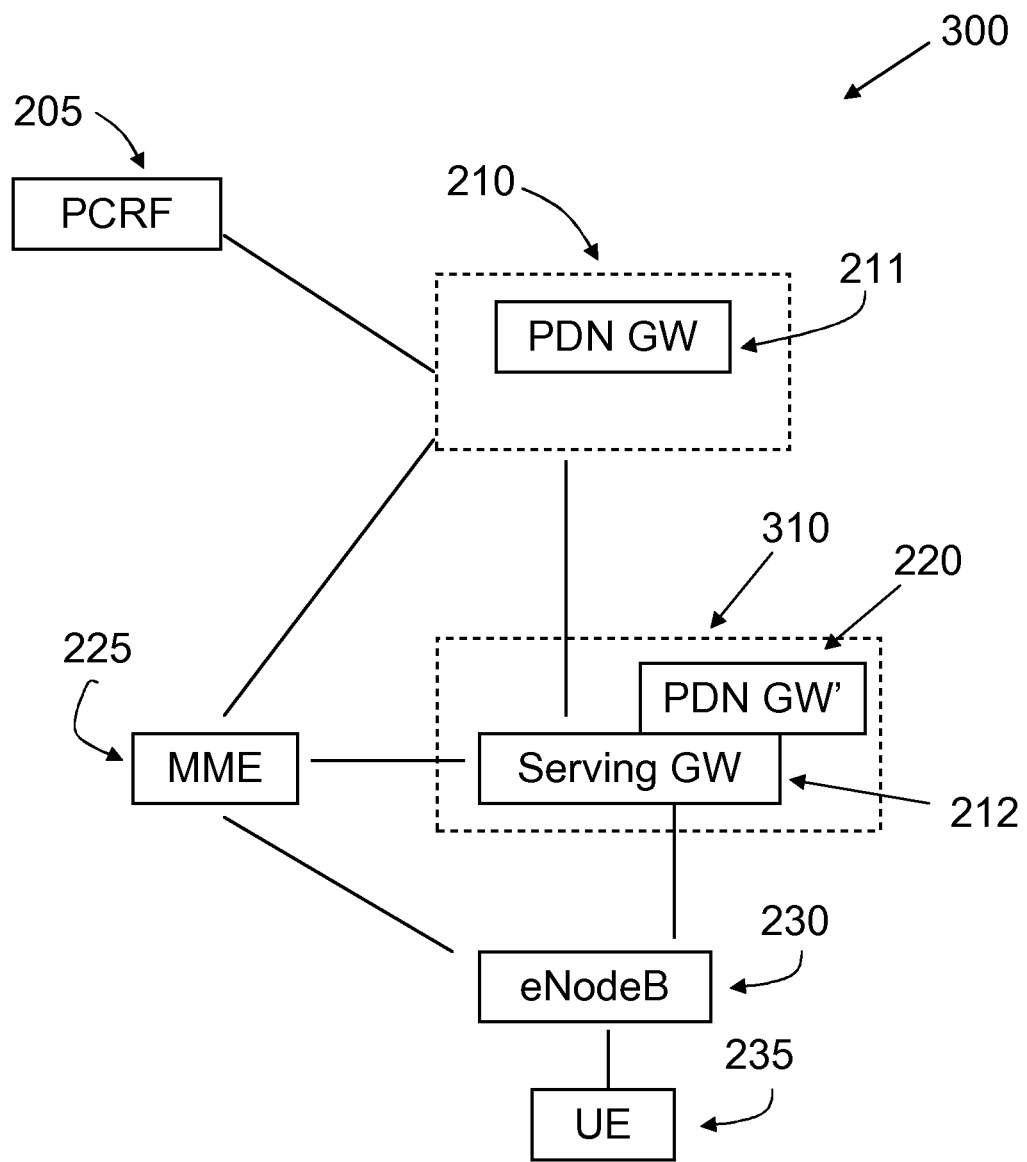

FIG. 3 shows a version 300 of the LTE system 200 shown in FIG. 2: the difference is that in FIG. 3 the "Offloading Mobile Gateway" 310 is a combination of a Serving Gateway 212 and a PDN GW' 220, with the Serving Gateway 212 being connected to the Mobile Gateway 210, which in this case only needs to comprise the PDN Gateway 211. In this case, the Serving Gateway 212 performs the filter function, thus obviating the need for a Serving Gateway in the Mobile Gateway 210. If the Serving Gateway 212 performs the filter function, it can either forward traffic to the Mobile Gateway 210, i.e. the first Mobile Gateway, or it can forward traffic within itself, i.e. to "its own" PDN GW, i.e. the PDN GW' 220.

As mentioned previously, the invention addresses the problem of the local/offload GW, and presents a solution which is able to select a central or local/offload GW on a per bearer (or Service Data Flow) basis. The invention is generically described to fit both for 3G WCDMA/HSPA and for EPC/LTE. The solution assumes 3GDT, 3G Direct Tunnel.

When a UE initiates a new service with an external AF, Application Function, the AF informs the PCRF, Policy and Charging Rules Function, about the new IP flow. The PCRF informs the GW about the new IP flow and what QoS this IP flow shall have. The GW (its PCEF, Policy and Charging Enforcement Function) decides if there is a need to set up a new bearer or if the IP flow should be added to an existing bearer (which may be modified).

If a new bearer is set up e.g. for a streaming video, the request for the new bearer shall also include an indication whether this bearer may/should be set up towards an offload GW or not.

The SGSN/MME receives the request and requests the bearer towards the RAN and secondly sets up the bearer either towards the same GW as all other bearers of this PDP ctxt/PDN connection; or it sets up this bearer specifically towards an offload GW. This can be achieved through reusing the PDN Connection request signaling but the SGSN/MME must also keep track of that this bearer is belonging to the same PDN connection as already exist towards another GW. The PDN Connection set up must in this case also include information that the PDN connection already has an IP address, but that all traffic through this bearer has to be NAT'ed in the offload GW. Note that to the UE, it would still appear as if all bearers belong to the same PDN connection.

Figure 4:
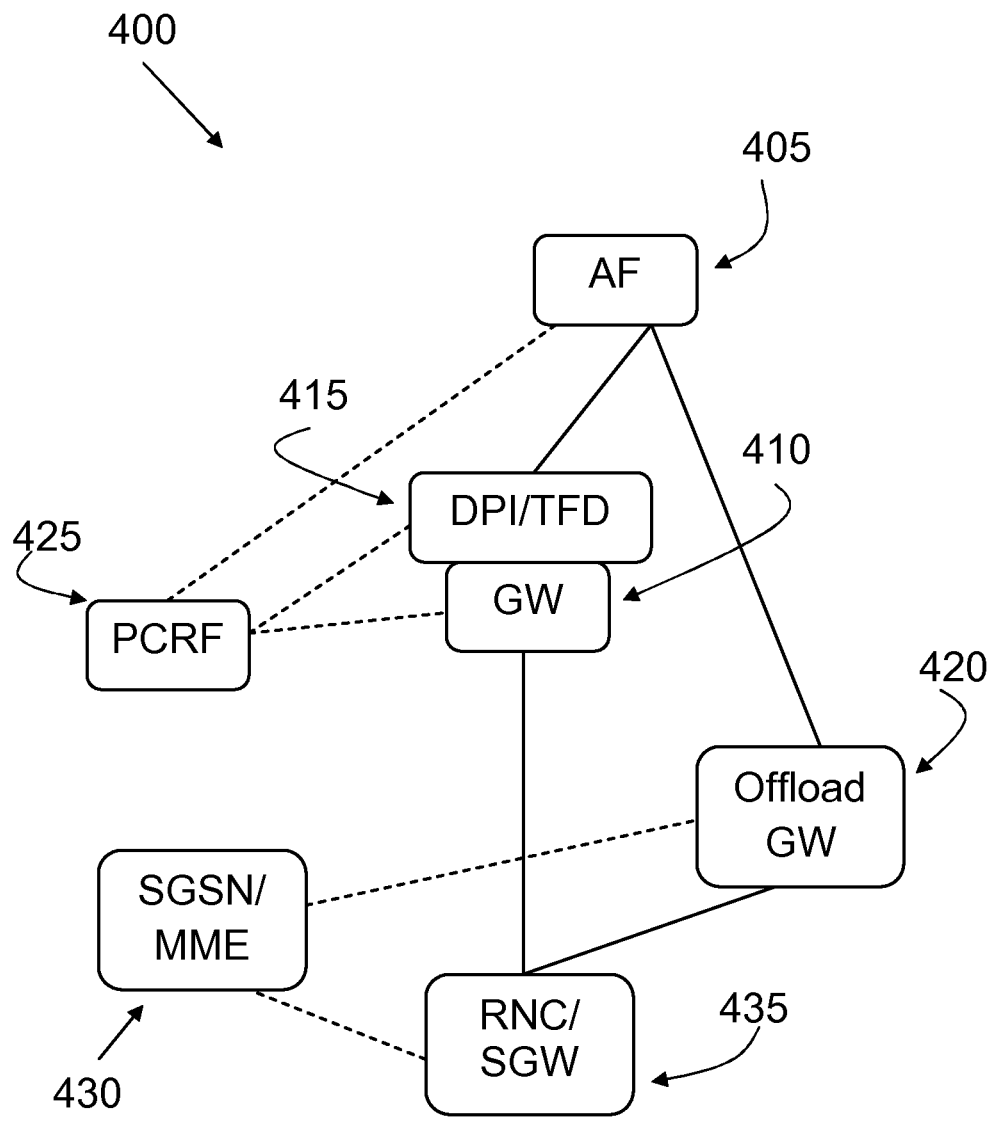

FIG. 4 shows a wireless access system 400 in which the invention is applied, and in which system wireless access 400 there are two possible access oaths after the RNC or SGW, either through the central GW 410 or through the Offload GW 420.

The uplink user plane, passing over multiple bearers from the UE, will now take two alternative paths from the RNC/SGW. The traffic transported over non-offloaded bearers are sent to the (central) GW while traffic transported over the offloaded bearers are sent to the Offload GW where the traffic is being NAT:ed.

Figure 5:
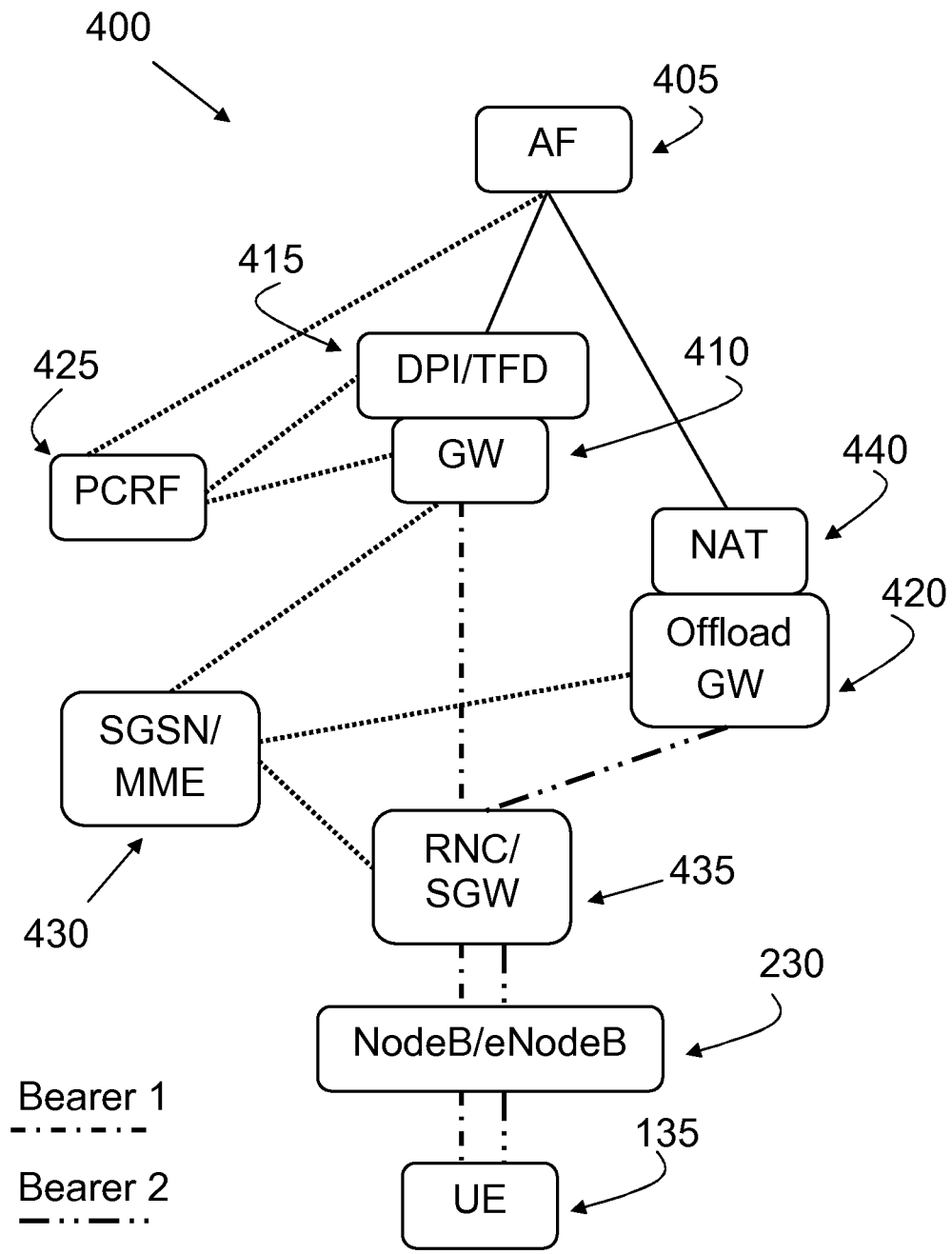
FIGS. 5 and 6 show possible traffic paths.

FIG. 5 shows how, in the wireless access system 400, "normal" traffic (Bearer 1) is routed through the central GW 410, whereas "offload traffic" (Bearer 2) is routed through the Offload GW 420, and the IP flows are separated after the RNC 435 (in the case of a 3G system) or after the SGW 435 (in the case of EPC/LTE systems.) Two bearers are shown as incoming to the RNC/SGW 435, and being separate to there, to be routed either to the central GW 410 or to the Offload GW 420.

As an alternative to the bearer initiation from the AF and PCRF, the bearer can also be set up through service flow detection in a separate DPI or TFD (Traffic Flow Detection) function which then similar to the AF triggers a request for a certain handling for this IP flow towards the PCRF. The flow from the PCRF and onwards is then the same as if initiated from the AF.

This means that the decision to do offload is done in the PCRF or the GW (PCEF) based on input from either the AF or the DPI/TFD function. The description in this text describes the case where the first bearer is always set up to the central GW, but it might also be possible to set up the first flow to the Offload GW and to set up further flows to the central GW. The same principles would apply for that case, but requires that the Offload GW is connected to a PCRF or the Offload GW itself takes the decision on selecting certain flows to the central GW. This alternative is not further elaborated in this text.

To move traffic transported over a bearer that has already been established, e.g. from a centrally routed bearer to an offloaded bearer, the existing bearer procedures can be re-used. The PCRF may e.g. updates the PCC rules in the central GW by e.g. changing a parameter to indicate that the flows should be offloaded. Alternatively, the central GW decides that a flow shall be offloaded. In both cases, the GW initiates bearer modification procedures and includes an indication that the existing bearer shall be offloaded. It may e.g. be a bearer termination procedure containing an indication that the traffic over the bearer shall be offloaded instead. It could also be a bearer modification procedure containing an indication that the flow described by the TFT shall be offloaded. When receiving the request, the MME/SGSN initiates dedicated bearer procedures for the offloaded GW, either creating a new bearer of modifying an existing bearer, to ensure that the flow is transported over to the offloaded bearers.

Concept of Alternative Solution

Figure 6:
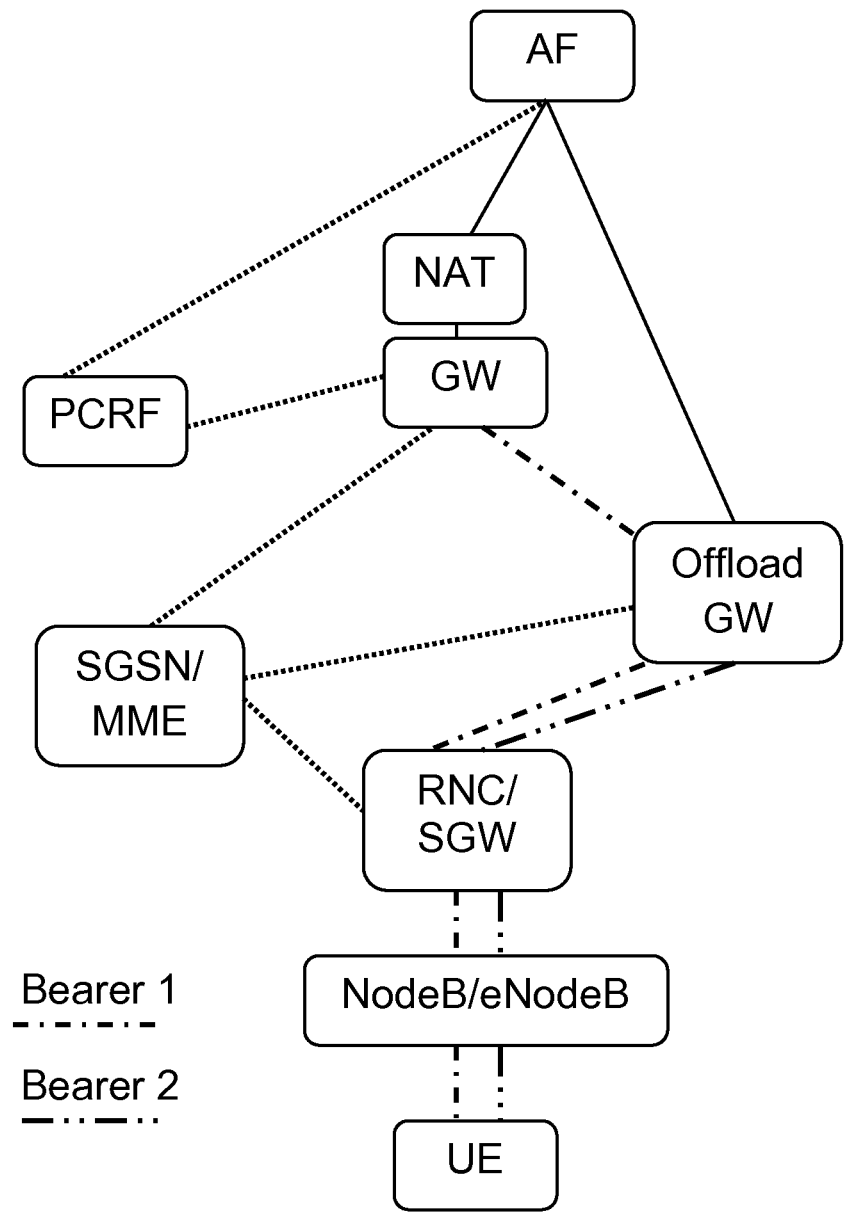

An alternative solution, shown in FIG. 6, would be that the Offload GW 420 is "on the path" between the RNC/SGW 430 and the central GW 410. In this case the Offload GW 420 takes out only the flows that shall be offloaded and the flows that shall be taken to the central GW 410 are forwarded (or re-encapsulated and sent) to the central GW 410. For this reason, both bearer 1 (non-offloaded, or "normal" traffic) and bearer 2 (off-load traffic) are shown as incoming to the offload GW 420, and only bearer 1 (non-offloaded) is shown as continuing from the offload GW 420.

A potential advantage of this alternative is that the Offload GW 420 can "snoop" the control signaling to the central GW 410, and thus the dedicated signaling to the offload GW 420 may be reduced.

Call Flows

Figure 7:
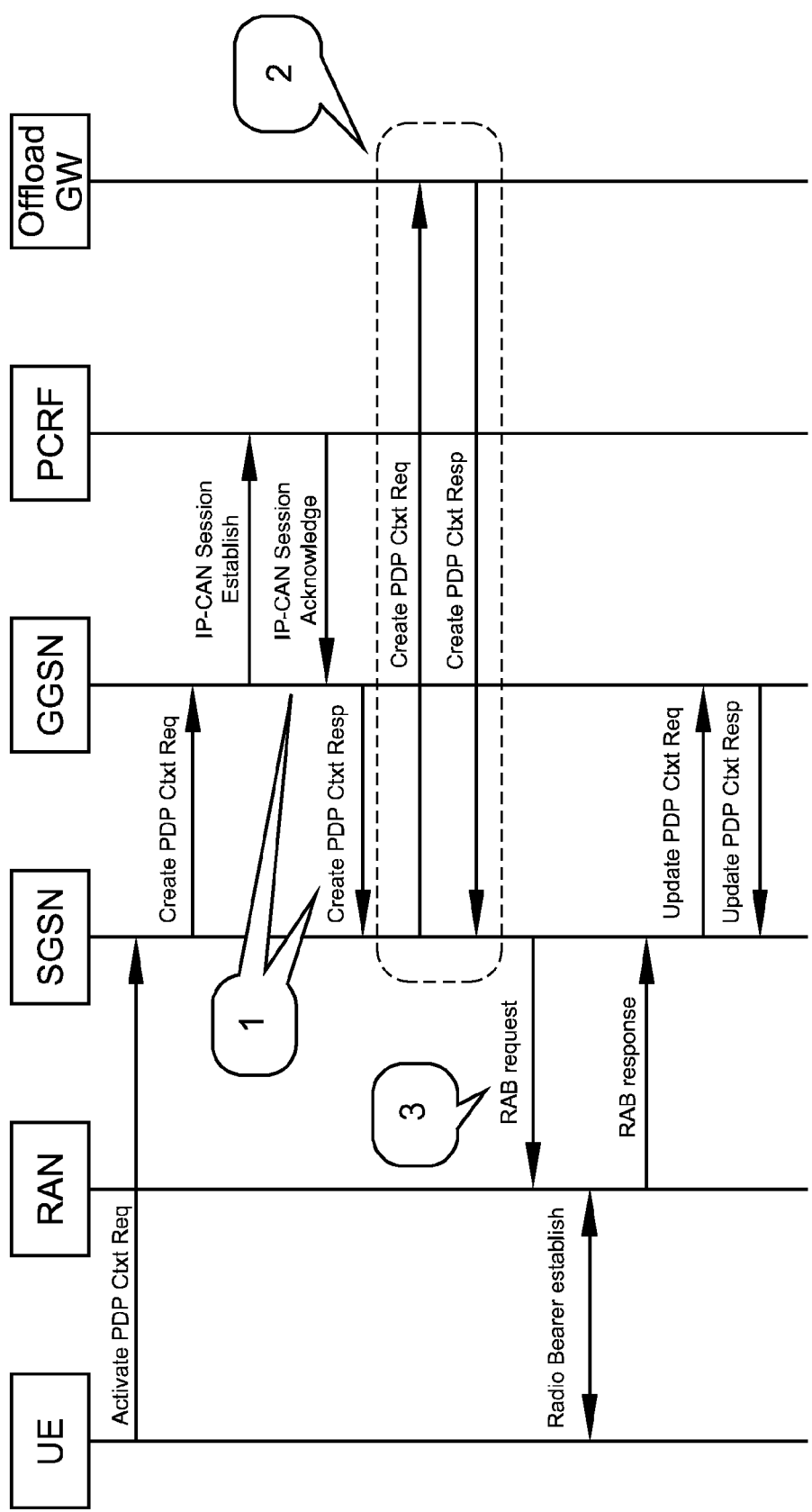
FIGS. 7-9 show call flows in a system of the invention.
Figure 8:
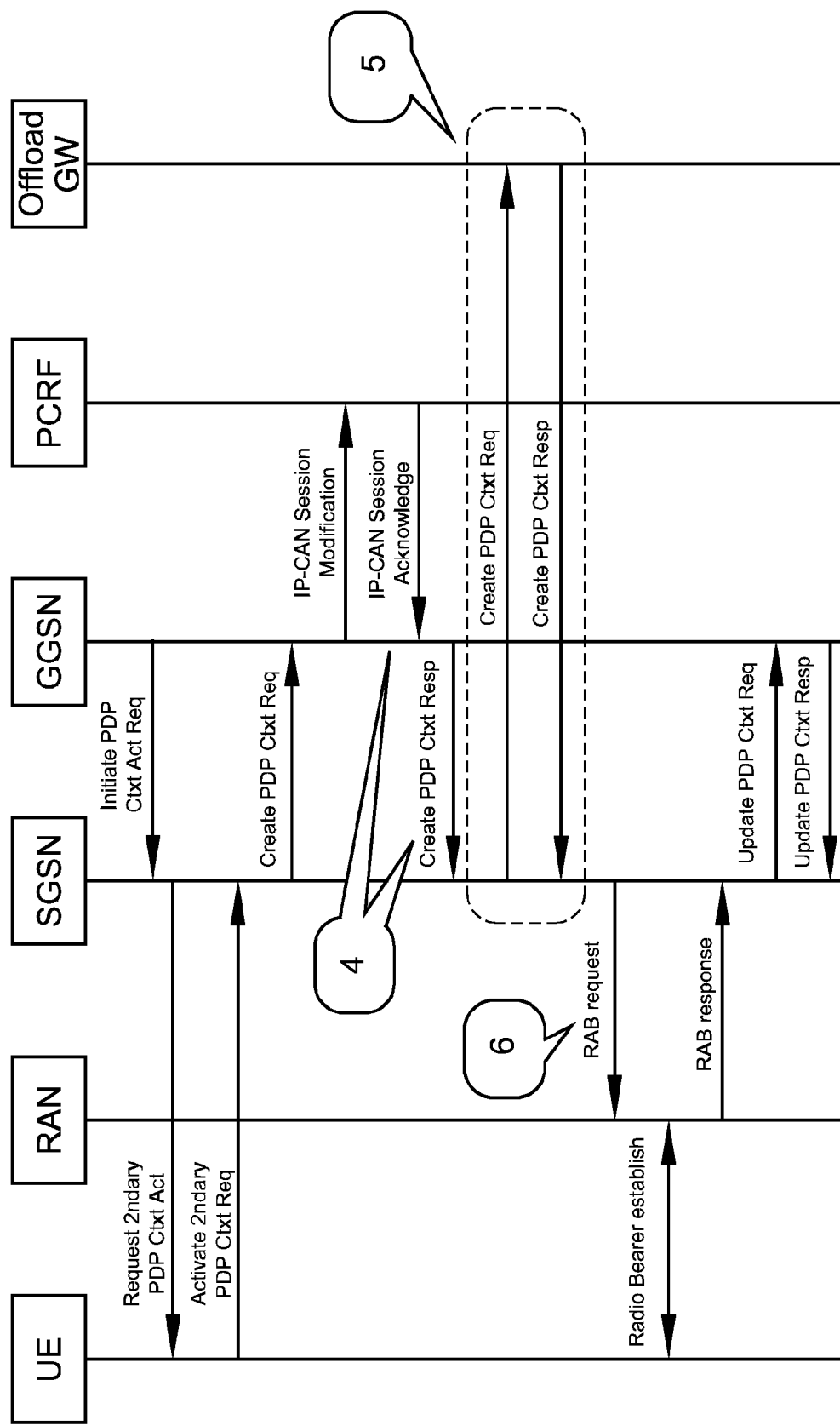
Figure 9:
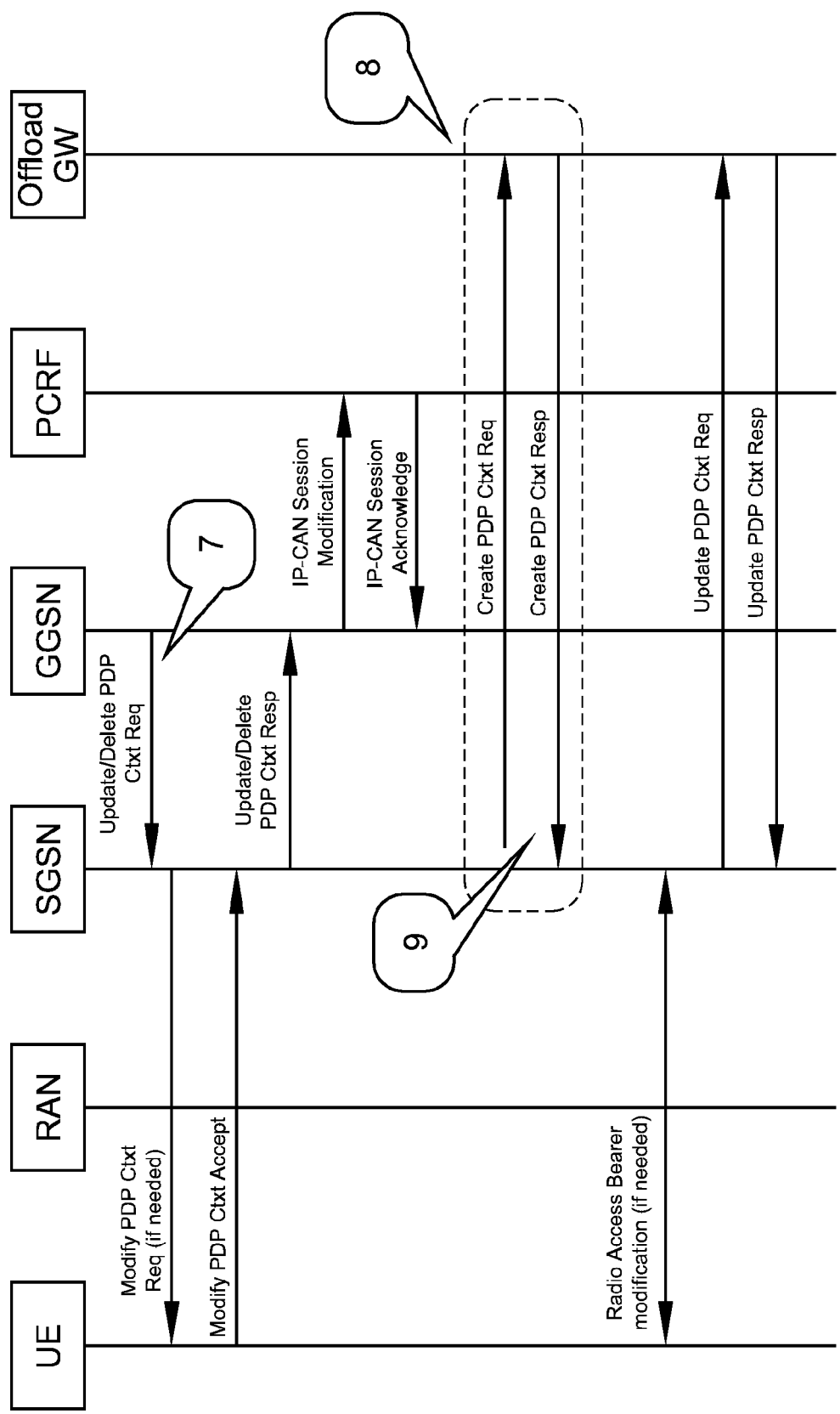

The included call flows in FIGS. 7-9 show the GPRS architecture, but are in general reusable in EPC/LTE systems as well. In the call flows of FIGS. 7-9, the PCRF does not have any interaction with the Offload GW, although cases can also be envisioned where the Offload GW also has an interface to the PCRF.

FIG. 7 shows the call flows when setting filters for offload traffic already at the Initial PDP ctxt (context) activation.

"Bubbles" 1-3 contain the following comments:

Bubble 1: These calls contain indications that certain flows should be offloaded.

Bubble 2: This may be handled either through separate signaling to the TIG, broadcast or that the TIG proxy the signaling to the GGSN. TIG is an embodiment of an offload GW, Terminal Internet Gateway.

Bubble 3: Download the filter with its parameters.

FIG. 8 shows the setting of filters for offload at establishment of a new bearer.

"Bubbles" 4-6 contain the following comments:

Bubble 4: An indication that certain existing flows shall be offloaded instead of routed to GGSN. The flows are removed from the bearer towards GGSN, and will instead be included in the bearers towards the TIG.

Bubble 5: This may be handled either through separate signaling to the TIG, broadcast or that the TIG proxy the signaling to the GGSN Bubble 6: Bearers are created (or modified) towards the TIG to handle the flows that are no longer routed via GGSN. If existing bearers towards the TIG can be re-used, an Update PDP context procedure is used instead of Create PDP Ctxt.

FIG. 9 shows how flows can be moved from the Central GW (here GGSN) to the Offload GW.

"Bubbles" 7-9 contain the following comments:

Bubble 7: An indication that certain existing flows shall be offloaded instead of routed to GGSN. The flows are removed from the bearer towards GGSN and will instead be included in the bearers towards the TIG.

Bubble 8: This may be handled either through separate signaling to the TIG, broadcast, or by proxy the signaling to the GGSN from the TIG.

Bubble 9: Bearers are created (or modified) towards the TIG to handle the flows that are no longer routed via GGSN. If existing bearers towards the TIG can be re-used, an Update PDP context procedure is used instead of Create PDP Ctxt.

The invention is not limited to the examples of embodiments described above and shown in the drawings, but may be freely varied within the scope of the appended claims. For example, as an implementation option, the Offload GW may be implemented together with the SGW and possibly also with the RNC as one physical entity. In addition, the filters for IP traffic can also be configured locally in the RNC.

The invention claimed is:

1. A method in a wireless access system comprising a Mobile Control Entity, the method comprising:
    the Mobile Control Entity communicating with a first Mobile Gateway and a Radio Network Control Entity,
    the Mobile Control Entity receiving a first instruction from the first Mobile Gateway that a filter for IP traffic from one or more User Equipments in the system should be arranged in the Radio Network Control Entity,
    the Mobile Control Entity receiving data from the first Mobile Gateway regarding the filter, said data comprising information on which IP traffic from one or more User Equipments that should be forwarded to the first or to a second Mobile Gateway respectively,
    the Mobile Control Entity transmitting second instructions to a second Mobile Gateway that it should establish a connection to the Radio Network Control Entity for IP traffic from one or more User Equipments in the system, wherein the step of transmitting the second instructions to the second Mobile Gateway comprises the Mobile Control Entity transmitting a packet with a header and a payload, said header comprising a destination address of the intended recipient of the packet, said destination address being an address allocated to the second Mobile Gateway, and the payload comprising data corresponding to at least part of the second instructions, and
    transmitting the second instructions and the data regarding the IP traffic filter to the Radio Network Control Entity.

2. A method in a Mobile Control Entity for a wireless access system, the method comprising:
    communicating with a first Mobile Gateway and a Radio Network Control Entity,
    receiving a first instruction from the first Mobile Gateway that a filter for IP traffic from one or more User Equipments in the system should be arranged in a second Mobile Gateway,
    receiving data from the first Mobile Gateway regarding the filter, said data comprising information on which IP traffic from one or more User Equipments that should be forwarded to the first or within the second Mobile Gateway respectively,
    transmitting second instructions to the second Mobile Gateway that it should establish a connection to the Radio Network Control Entity for IP traffic from one or more User Equipments in the system, wherein the step of transmitting the second instructions to the second Mobile Gateway comprises the Mobile Control Entity transmitting a packet with a header and a payload, said header comprising a destination address of the intended recipient of the packet, said destination address being an address allocated to the second Mobile Gateway, and the payload comprising data corresponding to at least part of the second instructions, and
    transmitting the second instructions and the data regarding the IP traffic filter to the second Mobile Gateway.

3. The method of claim 1, the Mobile Control Entity being a Serving GPRS Support Node, SGSN, for a WCDMA system, wherein:
    the first and second Mobile Gateways are Gateway GPRS Support Nodes, GGSNs, and
    the Radio Network Control Entity is a Radio Network Controller, RNC.

4. The method of claim 1, the Mobile Control Entity being a Serving GPRS Support Node, SGSN, for a WCDMA system, wherein:
    the first and second Mobile Gateways comprise a Packet Data Network Gateway, PDN GW, and a Serving Gateway, Serving GW, and
    the Radio Network Control Entity is an eNodeB.

5. The method of claim 1, the Mobile Control Entity being a Mobility Management Entity, MME, for an LTE system, wherein:
    the first and second Mobile Gateways both comprise a Packet Data Network Gateway and at least one of them comprises a serving Gateway, and
    the Radio Network Control Entity is an eNodeB.

6. A wireless access system comprising:
    a Mobile Control Entity,
    a first Mobile Gateway,
    a second Mobile Gateway,
    a Radio Network Control Entity, wherein
    the Mobile Control Entity is arranged to communicate with the first Mobile Gateway and the Radio Network Control Entity, and the first Mobile Gateway and the Radio Network Control Entity are arranged to communicate with each other,
    the first Mobile Gateway is arranged to instruct the Mobile Control Entity that a filter for IP traffic from one or more User Equipments in the system should be arranged in the Radio Network Control Entity,
    the Mobile Control Entity is arranged to:
    (i) receive a first instruction from the first Mobile Gateway that a filter for IP traffic from one or more User Equipments in the system should be arranged in the Radio Network Control Entity,
    (ii) receive data from the first Mobile Gateway regarding the filter, said data comprising information on which IP traffic from one or more User Equipments that should be forwarded to the first or to the second Mobile Gateway respectively,
    (iii) transmit second instructions to the second Mobile Gateway that it should establish a connection to the Radio Network Control Entity for IP traffic from one or more User Equipments in the system by the Mobile Control Entity transmitting at least one packet with a header and a payload, said header comprising a destination address of the intended recipient of the packet, said destination address being an address allocated to the second Mobile Gateway, and said payload comprising data corresponding to at least part of the second instructions, and (iv) transmit the second instructions and the data regarding the IP traffic filter to the Radio Network Control Entity, and the Radio Network Control Entity is arranged to receive instructions from the Mobile Control Entity that a filter for IP traffic from one or more User Equipments in the system should be arranged in the Radio Network Control Entity, and to carry out the function of said filter, regarding which traffic that should be sent to the first or the second mobile Gateway.

7. A wireless access system comprising:
a Mobile Control Entity,
a first Mobile Gateway,
a second Mobile Gateway,
a Radio Network Control Entity, wherein
the Mobile Control Entity is arranged to communicate with the first Mobile Gateway and the Radio Network Control Entity, and the first Mobile Gateway and the Radio Network Control Entity are arranged to communicate with each other,
the first Mobile Gateway is arranged to instruct the second Mobile Gateway that a filter for IP traffic from one or more User Equipments in the system should be arranged in the second Mobile Gateway,
the Mobile Control Entity is arranged to:
(i) receive a first instruction from the first Mobile Gateway that a filter for IP traffic from one or more User Equipments in the system should be arranged in the second Mobile Gateway,
(ii) receive data from the first Mobile Gateway regarding the filter, said data comprising information on which IP traffic from one or more User Equipments that should be forwarded to the first Mobile Gateway or be forwarded within the second Mobile Gateway,
(iii) transmit second instructions to the second Mobile Gateway that it should establish a connection to the Radio Network Control Entity for IP traffic from one or more User Equipments in the system by the Mobile Control Entity transmitting at least one packet with a header and a payload, said header comprising a destination address of the intended recipient of the packet, said destination address being an address allocated to the second Mobile Gateway, and said payload comprising data corresponding to at least part of the second instructions, and
(iv) transmit the second instructions and the data regarding the IP traffic filter to the second Mobile Gateway, and
the Radio Network Control Entity is arranged to receive instructions from the Mobile Control Entity that a filter for IP traffic from one or more User Equipments in the system should be arranged in the Radio Network Control Entity, and to carry out the function of said filter, regarding which traffic that should be sent to the first or the second mobile Gateway.

8. The wireless access system of claim 6, being a WCDMA system, wherein:
the Mobile Control Entity is a Serving GPRS Support Node, an SGSN,
the first and second Mobile Gateways are Gateway GPRS Support Nodes, GGSNs, and
the Radio Network Control Entity is a Radio Network Controller, an RNC.

9. The wireless access system of claim 6, being a WCDMA system, wherein:
the Mobile Control Entity is a Serving GPRS Support Node, an SGSN,
the first and second Mobile Gateways comprise a Packet Data Network Gateway, a PDN GW, and a Serving Gateway, a Serving GW, and
the Radio Network Control Entity is an eNodeB.

10. The wireless access system of claim 6, being an LTE system, wherein:
the Mobile Control Entity is a Mobility Management Entity, an MME,
the first and second Mobile Gateways both comprise a PDN GW, Packet Data Network Gateway and at least one of them comprises a serving GW, and
the Radio Network Control Entity is an eNodeB.

11. The method of claim 1, wherein the wireless access system is a core network and further comprises the second Mobile Gateway and the Radio Network Control Entity.

12. The method of claim 1, wherein the second Mobile Gateway is not a local Packet Data Network Gateway.

13. The method of claim 1, wherein the second Mobile Gateway is not part of or connected to a femto base station.

14. The method of claim 1, further comprising:
the second Mobile Gateway receiving offload traffic transmitted by one of said User Equipments, said offload traffic comprising a packet with a header and a payload, said header comprising a source address field containing an address allocated to said one of said User Equipments;
the second Mobile Gateway modifying the source address field of the packet such that the source address field contains an address assigned to the second Mobile Gateway in place of the address allocated to said one of said User Equipments, thereby generating a modified packet;
the second Mobile Gateway transmitting the modified packet.

15. The method of claim 1, further comprising:
the second Mobile Gateway receiving offload traffic destined for one of said User Equipments, said offload traffic comprising a packet with a header and a payload, said header comprising a destination address field containing an address allocated to said second Mobile Gateway;
the second Mobile Gateway modifying the destination address field of the packet such that the destination address field contains an address assigned to said one of said User Equipments in place of the address allocated to said second Mobile Gateway, thereby generating a modified packet;
the second Mobile Gateway transmitting the modified packet towards said one of said User Equipments.

* * * * *